United States Patent [19]

Street, Jr.

[11] 4,167,214
[45] Sep. 11, 1979

[54] PROCESS FOR STABLY SEQUESTERING IRON WHILE ACIDIZING A RESERVOIR

[75] Inventor: Evan H. Street, Jr., Houston, Tex.

[73] Assignee: Shell Oil Company, Houston, Tex.

[21] Appl. No.: 924,269

[22] Filed: Jul. 13, 1978

[51] Int. Cl.² .............................................. E21B 43/27
[52] U.S. Cl. .................................. 166/307; 166/308; 252/8.55 C
[58] Field of Search .............. 166/271, 273, 274, 281, 166/282, 307, 308; 252/8.55 C

[56] References Cited

U.S. PATENT DOCUMENTS

| | | | |
|---|---|---|---|
| 2,175,095 | 10/1939 | Stoesser | 166/307 |
| 2,217,676 | 10/1940 | Fry | 166/307 UX |
| 2,652,360 | 9/1953 | Bond et al. | 166/307 |
| 3,021,279 | 2/1962 | Scanley | 166/271 X |
| 3,142,335 | 7/1964 | Dill et al. | 166/307 X |
| 3,254,718 | 6/1966 | Dunlap | 166/307 |
| 3,799,266 | 3/1974 | Kiel | 166/307 X |
| 3,945,438 | 3/1976 | Tate et al. | 166/307 |
| 4,089,787 | 5/1978 | Lybarger et al. | 166/307 X |
| 4,090,563 | 5/1978 | Lybarger et al. | 166/307 |
| 4,096,914 | 6/1978 | McLaughlin et al. | 166/307 |

*Primary Examiner*—Stephen J. Novosad
*Assistant Examiner*—George A. Suchfield

[57] ABSTRACT

In a well treating process in which an acidic solution having a pH of less than about 2 tends to dissolve ferric ion-containing materials from the well conduits and to precipitate ferric ion-containing solids when the pH of the solution increases beyond about 3, such a precipitation can be prevented by dissolving limited proportions of both 5-sulfosalicylic acid and citric acid within the acidic solution to be injected.

11 Claims, No Drawings

PROCESS FOR STABLY SEQUESTERING IRON WHILE ACIDIZING A RESERVOIR

BACKGROUND OF THE INVENTION

The invention relates to well treatment processes for acidizing subterranean reservoir formations. It is particularly useful for treating reservoirs which are relatively hot and contain significant proportions of acid soluble calcium compounds.

It is known that aqueous solutions of strong acid dissolve significant proportions of ferric and ferrous iron from iron containers or conduits or components of subterranean reservoir formations. For example, a paper of Journal of Petroleum Technology, September 1969, pages 1121 to 1129, indicates that the dissolved iron content in spent acids from wells treated in West Texas was significantly high and, in some cases, about 2.6 percent. It states that "Sequestering agents have been used for many years to prevent the reprecipitation of iron from spent acid solutions. Those most commonly used include citric acid, acetic acid, mixtures of citric and acetic acids, lactic acid, gluconic acid, ethylenediaminetetraacetic acid (EDTA), and nitrilotriacetic acid (NTA)." And, "The EDTA, NTA, and citrate complexes of iron are much more stable than the acetate."

Patent application Ser. No. 748,087, filed Dec. 6, 1976, now U.S. Pat. No. 4,096,914, by W. A. McLaughlin and E. A. Richardson (the 087 application) indicates that, in addition to being capable of forming permeability impairing hydrated iron oxides, ferric ions in an oil reservoir acidizing fluid are also capable of forming permeability impairing iron-asphaltene solids, particularly in reservoirs containing more than about 1/2% by weight of asphaltenic components. The solids formed by the interaction between ferric ions and asphaltenes are particularly insoluble. Although none of the prior art located before the 087 application was filed mentioned problems due to solids formed by the interaction of iron and asphaltenes, the difficulties of removing organic deposits containing asphaltenic materials were known. For example, the need for using solvents containing both an aromatic hydrocarbon and an amine in order to dissolve asphaltene-containing deposits was described in application B-359,946, published Jan. 28, 1975 (now U.S. Pat. No. 3,914,132).

The 087 application indicates that the forming and precipitating of iron-asphaltene solids due to the interaction of a ferric ion-containing aqueous acid and a crude oil is not readily apparent, due to the relatively slow precipitate development and emulsion-forming tendencies of such a system. However, based on many tests of numerous types of reducing agents and iron chelating materials, that application was premised on a discovery that the incorporation of salicyclic acid within a ferric ion-containing aqueous solution of a strong acid was uniquely effective in preventing the formation of permeability impairing iron-asphaltene solids.

Numerous patents relate to using chelating agents for avoiding the deleterious effects of dissolved iron in well treatments involving aqueous strong acids. For example, in U.S. Pat. No. 2,175,081, which was applied for in 1937, it is suggested that most of such deleterious effects are due to the precipitation of ferric ions, and such effects can be avoided by incorporating a water-soluble reducing agent within the injected acid. U.S. Pat. No. 2,175,095 suggests the inclusion within an acidizing fluid of a material such as lactic acid, ammonium acetate, glycine, glycolic acid, citric acid, or the like, which is capable of preventing the precipitation of iron or aluminum hydrates at their normal precipitation pH values. U.S. Pat. No. 2,335,689 suggests a similar inclusion of an iron sequestering agent, such as a polyhydric phenol within the injected acids. U.S. Pat. No. 3,142,335 suggests such a use of a sequestering agent containing a mixture of ingredients that function as a buffering agent, such as citric acid or citrate salt mixed with acetic or formic acids or their salts. U.S. Pat. No. 3,150,081 suggests s similar incorporation of mixtures of hydroxyacetic and citric acids, which mixtures are said to be cheaper and more effective than such a use of either of those acids by itself.

Patent application Ser. No. 809,586 filed June 24, 1977, now U.S. Pat. No. 4,137,972 by W. A. McLaughlin and D. C. Berkshire describes a discovery that with respect to chelating ferric ions that become dissolved in a strong acid solution in order to keep those ions from forming iron-asphaltenic solids, 5-sulfosalicylic acid was found to be more beneficial than salicylic acid, for the following reasons: the 5-sulfosalicylic acid (a) chelates with more ferric ions at a lower mole ratio of chelating agent to ferric ions at pH's of less than about 3, (b) has a much greater water-solubility at the lower pH's and (c) forms calcium salts which are significantly water-soluble and are capable of avoiding any deleterious precipitation of calcium sulfosalicylate.

SUMMARY OF THE INVENTION

The present invention relates to a well treating process in which an aqueous acid having a pH of less than about 2 is injected into a subterranean reservoir in a manner such that materials that contain ferric ions are present in the acid and, as the acid reacts within the reservoir and attains a pH exceeding about 3, tend to be precipitated as ferric ion-containing solid materials that may plug the pores of the reservoir. In accordance with the present invention such a precipitation is prevented by dissolving in the acid to be injected (a) an amount of 5-sulfosalicylic acid which is at least sufficient to sequester significant proportions of ferric ions when the pH of the acid is from about 0.5 to 3 but is less than enough to cause a significant salting-out of solid materials, and (b) an amount of citric acid which is at least sufficient to sequester significant proportions of ferric ions when the pH of the acid is from about 3 to 6 but is less than enough to precipitate a significant amount of calcium citrate.

DESCRIPTION OF THE INVENTION

The present invention is, at least in part, premised on a discovery that (a) although citric acid fails to sequester ferric ions (by incorporating them into water-soluble complex materials) when the pH is less than about 3, (b) although only a relatively small proportion of citric acid which can be safely maintained in an acidizing solution, because of the probable dissolving of calcium compounds and low solubility of calcium citrate, (c) although the water soluble complex materials by which ferric ions are sequestered by practical concentrations of 5-sulfosalicylic acid tend to be relatively quickly destroyed by hydrolysis at moderate temperatures, such as about 120° F., and (d) although the proportion of 5-sulfosalicylic acid which can be dependably utilized to sequester ferric ions is limited by the tendency for it and/or the complex materials it forms with ferric ions to be salted-out of solution when a relatively strong acid solution is neutralized so that the spent acid becomes a relatively concentrated solution of salt—unobviously, when both citric acid and 5-sulfosalicylic acid are dissolved within an aqueous acid solution (in the above specified proportions) no precipitation is induced when the neutralizing of the acid increases the pH of the solution from less than 1 to above 6—not even when the so-treated solution is maintained at more than 120° F. for more than 16 hours.

As known to those skilled in the art, the proportion of dissolved ferric ion containing materials, which is significant with respect to reducing the permeability of a reservoir by precipitating ferric ion-containing solids, varies with variations in the permeability of the reservoir. Ferric ion-containing compounds are easily hydrolyzed and tend to start precipitating from an aqueous solution (at a pH of about 2.2) in the form of gelatinous ferric hydroxides or hydrated ferric oxides that effectively plug the pores of a reservoir. Although such precipitates could be dissolved in an aqueous acid having a lower pH, once the pores in a particular portion of a reservoir have been plugged, subsequent injections of any fluid tends to bypass the plugged pores. This makes it difficult to remove a pore-plugging material no matter how soluble it may be. In general, it is preferable that an aqueous acid solution injected in accordance with the present process contain from about 0.001 to 0.009 moles per liter of citric acid and from about 0.01 to 0.05 moles per liter of 5-sulfosalicylic acid.

In general, the aqueous strong acid used in the present invention can be substantially any which is capable of dissolving solid materials encountered within a subterranean reservoir. Such acids generally comprise solutions and/or homogeneous dispersions or emulsions of an aqueous hydrochloric acid, or a mixture of hydrochloric acid with hydrofluoric acid and/or thickeners, corrosion inhibitors, wetting agents, or the like. The hydrochloric acid content of such solutions can range from about 1 to about 30% by weight. Particularly suitable acids for use in the present invention comprise aqueous hydrochloric acids containing from about 5 to 15% hydrochloric acid, and aqueous mud acids containing from about 5 to 15% hydrochloric acid mixed with from about 1 to 3% hydrofluoric acid.

In acidizing a reservoir in accordance with the present invention, the aqueous strong acid solution containing the citric and sulfosalicylic acids may be injected before, during or after the injection of other formation-treating materials For example, such solutions may be emulsified with or injected ahead of or behind a liquid oil solvent, e.g., a liquid hydrocarbon. Where an oil solvent is used, it is preferably a solvent for asphaltenic oils, such as a normally liquid aromatic hydrocarbon having an asphaltenic oil solubility at least substantially equivalent to that of toluene. The aqueous strong acid solution containing the citric and sulfosalicylic acids may also be injected along with or ahead of or behind a relatively viscous aqueous solution containing a water-thickening agent. Suitable thickening agents include biopolymers, e.g., Kelzan or Xanflood Xanthan gum biopolymers (available from Kelco Company); Polytran nonionic biopolymers (available from Pillsbury Company); partially hydrolized polyacrylamides, e.g., Pusher (available from Dow Chemical Company); or the like.

In general, in a well treatment process, most if not all of the ferric ions that become dissolved in an aqueous acid that is injected into a reservoir formation will be derived from contaminants in the acid as delivered at the well site, or will be dissolved from rust and/or scale in the containers or conduits utilized in flowing the acid into the reservoir. Therefore, if the acid, as delivered at the well site, and the reservoir to be acidized is substantially free of ferric ions, most if not all of the sulfosalicylic acid which is used in the present process need only be incorporated within the first injected portion of the acid. That portion should be large enough to remove substantially all of the rust from the iron containers through which the acid is flowed. Although the succeeding portions of acids will dissolve iron from the rust-free conduits, substantially all of that iron will be in the ferrous state.

In a particularly suitable procedure for conducting the present process, a volume of liquid solvent for asphaltenic oil (e.g., toluene) sufficient to dissolve most of the oil within the first few feet around the well is injected along with the citric acid and salicylic acid-containing acidizing acid in the form of an oil-in-water emulsion. Alternatively, such a volume of such a solvent can be injected in the form of a slug preceding the injection of the acid.

Where the reservoir being treated by the present process is relatively unconsolidated, the procedure for injecting an oil solvent and the acidizing acid and returning the well to injection or production can advantageously be the slow injection and return procedure described in the J. H. Lybarger U.S. Pat. No. 3,948,324. Where the reservoir is siliceous and its permeability may be impaired by clay or silica fines, at least a portion of the acidizing acid should be a mud acid, and the materials injected should include pretreatment slugs of hydrochloric acid and ammonium chloride to enhance the clay-dissolving action of the mud acid. Where the reservoir is relatively free of permeability-impairing clay or siliceous materials, the acidizing acid can be free of hydrogen fluoride (which will eliminate the need for such HCl and NH$_4$Cl pretreatments) but the relatively slow injection of fluids and slow return to the injection or production rate best suited for the particular well can advantageously be those described in the patent.

In including citric and sulfosalicylic acids in a formation treating aqueous acid in accordance with the present process, various forms of starting materials and various procedures can be used to form a suitable solution and/or homogeneous dispersion. Sulfosalicylic and/or citric acid and/or at least one alkali metal or ammonium sulfosalicylate and/or citrate in the form of a solid or solution (preferably aqueous) can be simply mingled with the formation treating acid and agitated to an extent sufficient to provide a solution and/or homogeneous dispersion. Alternatively, such a form of either acid or salt can be premixed with the formation treating acid along with a solubilizing agent, e.g., a completely water miscible monohydric or polyhydric alcohol. Alternatively, such an acid or salt can be mixed with the formation treating acid along with an oil solvent liquid and agitated to provide an oil and water emulsion or dispersion. Alternatively, such a solution or dispersion of sulfosalicylic and/or citric acid or their salts can be injected into the reservoir immediately ahead of the formation treating acid (which may or may not be mixed with solubilizing agents or oil solvents) so that the formation treating acid is mixed with the sulfosalicylic and citric acids within the reservoir formation.

Particularly advantageous well treating procedures comprise (a) premixing the reservoir formation treating acid (and/or a mixture of it and an oil solvent) with the solid citric and sulfosalicylic acids or an aqueous solution of their salts or (b) where the well or subterranean earth formation to be treated may contain aqueous solutions of ferric ions within the zone to be treated, injecting a slug of an aqueous solution of the acid or its salt before injecting the citric and sulfosalicylic acid-containing portion of the formation treating acid.

The primary object of the present invention is to dissolve, within an aqueous reservoir acidizing fluid, a kind and amount of ferric ion-chelating agents that are capable of sequestering ferric ions in such a way that no precipitation of solid ferric ion-containing materials is induced by the increase of pH resulting from the spending of the acid on the acid-reactive components of the reservoir formation. This imposes a number of requirements on the sequestering agent: (1) it must be stabled toward strong acids, such as hydrochloric acids, at the reservoir temperature; (2) it must be effective throughout a pH range of from about 2 to 6, i.e., from the time ferric ions are no longer sequestered by the hydrochloric acid (in the form of chloroferric acids) to the time the acidizing solution is substantially spent; and (3) the sequestering agent must form water-soluble salts with the cations (such as calcium ions) normally encountered in the acidization of a reservoir formation.

LABORATORY TESTS

Numerous problems are encountered in simulating a formation damaging precipitation and/or sequestering action of the type which occurs within a reservoir acidizing solution. Various sequesterants form deeply and dark colored solutions which are not translucent at concentrations representative of practical acidizing solutions. This makes it difficult to visually observe the formation of precipitates and, although some systems form a transient turbidity at one pH, they clear up as soon as the pH is slightly greater. And, some systems which appear optically clear and free of precipitates actually contain solids that are capable of plugging fine pores.

In tests such as those described below a standardized ferric ion content was provided by 0.02 moles per liter of ferric chloride (providing about 1000 ppm ferric ions). The solutions of ferric ions were mixed with selected proportions of hydrochloric acid and sequestering agents. In some cases sodium chloride was added in order to simulate the neutralization of the hydrochloric acid with the alkaline materials encountered in a typical reservoir formation. A 7.5 weight percent hydrochloric acid is 2.2 molar and a 15% acid is 4.4 molar. Thus, when a solution contains 0.02 moles per liter of ferric chloride and 2.2 or 4.4 moles per liter of sodium chloride and enough hydrochloric acid to provide a selected pH, the solution is representative of a 7½ or 15% HCl solution which has been neutralized reacting within a reservoir formation.

In typical tests 20 milliliter samples of the solution being tested were stirred on a hot plate with a Teflon stirring bar at the temperature selected for the test. The pH was increased from a value less than 1 to the selected value by adding sodium hydroxide. At the desired pH the solutions were filtered through an 0.6 micron polyvinylchloride membrane filter. If a significant amount of precipitate was present the rate of filtration decreased markedly and a permanent staining of the filter membrane was apparent (usually having the orange-brown color typical of ferric hydroxide). The filtrate was then returned to the beaker and the pH increased farther by adding more sodium hydroxide. The tests thus indicated the pH range at which the precipitates began to form and the approximate amount of precipitates that were formed.

Long-term thermal exposure tests were also conducted using culture tubes with Teflon-lined screw caps. The samples being tested (at the selected pH) were maintained at the desired temperature in an oven. In such tests it was observed that when precipitates were apt to form from a given system, the beginning of the precipitation would usually become obvious within a few hours.

5-Sulfosalicylic Acid: 0.02 M FeCl$_3$, 0.02 M 5-sulfosalicylic acid

This system failed the filter membrane test at room temperature. Slight amounts of precipitate were found at pH=2 to 4.

0.02 M FeCl$_3$, 0.04 M 5-sulfosalicylic acid

At room temperature, this system yielded no precipitates in the range pH=1.30 to 6.00. However, at 75° C., slight staining of the filter membrane was noted in the range pH=4.00 to 5.25. The filtrate hydrolyzed completely when heated to 88° C. for one hour in a culture tube.

As an additional test of this system, 10 ml samples of the solution were placed in each of three culture tubes. The pH of the first was measured and found to be 1.30. The pH of the second was adjusted with NaOH to pH=3.05. The pH of the third was adjusted to pH=4.10. All tubes were sealed and placed in the oven at 88° C. After 12 hours at 88° C., the tubes were observed. At pH=1.30, no change was noted. At pH=3.05 and 4.10, hydrolysis with the formation of an orange precipitate was evident.

0.02 M FeCl$_3$, 0.04 M 5-sulfosalicylic acid, 7.5 wt. % HCl

This system failed the filter membrane test at room temperature. Precipitation was noted in the range pH=4.00 to 6.10.

0.02 M FeCl$_3$, 0.04 M 5-sulfosalicylic acid, 2.2 M NaCl

This solution was prepared mainly to evaluate the hypothesis that the above precipitation involved a "salting-out" phenomenon (i.e., that NaOH neutralized the HCl before hydrolysis occurred and that NaCl and HCl would behave identically). This proved to be the case. Precipitation was noted from pH=4.40 to 6.00.

0.02 M FeCl$_3$, 0.04 M 5-sulfosalicylic acid, 1 M NaCl

An additional experiment was run to see if lowering the equivalent hydrochloric acid content would have any beneficial effect on such a system (1 M NaCl corresponds to 3.4 wt. % HCl). Precipitation was noted at pH=4.05 at 75° C. This hydrochloric acid concentration would almost be impractically low for most well treating operations.

0.02 M FeCl$_3$, 0.06 M 5-sulfosalicylic acid

The filter membrane test on this system was carried out at 75° C. Slight staining of the filter membrane was noted from pH=4.03 to 6.30. The filtrate was then heated in a culture tube at 88° C. Hydrolysis with precipitation was noted after one hour.

0.02 M FeCl₃, 0.08 M 5-sulfosalicylic acid

About 15 ml each of this solution were placed in three culture tubes. The first had a pH=1.25. The second was adjusted (with 0.5 N NaOH) to pH=3.00. The third was adjusted to pH=4.50. All culture tubes were sealed and placed in the oven at 88° C. for two hours. No evidence for hydrolysis was noted.

0.02 M FeCl₃, 0.08 M 5-sulfosalicylic acid, 4.4 M NaCl

An aliquot of the 0.02 M FeCl₃+0.08 M 5-sulfosalicylic acid was placed in a bottle and sufficient NaCl to render the solution 4.4 M was added. A precipitate formed which did not look like NaCl. This was agitated for about 10 minutes, then filtered. A voluminous white precipitate was obtained. Apparently, 5-sulfosalicylic acid is salted-out extensively by 4.4 M NaCl. About 15 ml of the filtrate were placed in a culture tube and the pH increased (with 0.5 M NaOH) to 5.5. Obvious precipitation was noted at this pH. Therefore, a significant amount of the 5-sulfosalicylic acid was salted out under these conditions.

0.02 M FeCl₃, 0.08 M 5-sulfosalicylic acid, 2.2 M NaCl

Attempts to prepare this solution also yielded a white precipitate, but not as much as with 4.4 M NaCl. The pH of the filtrate was increased to 4.25 by the addition of NaOH. Hydrolysis with precipitation occurred on heating at 88° C. for 12 hours.

0.02 M FeCl₃, 0.04 M ammonium salicylate

A solution containing 0.02 M FeCl₃ and 0.44 M ammonium salicylate had an initial pH=2.37. A voluminous brown precipitate was obtained between pH=3 to 6.

Another aliquot was treated with (1:1) HCl. At pH=0.7, the solution was still highly colored (purple), but a white precipitate had formed. This is probably salicylic acid precipitating out at low pH, and indicates that this limited solubility in this pH range would render salicylic acid or its salts ineffective as a ferric ion sequestering agent over the requisite pH range.

Citric Acid: 0.02 M FeCl₃, 0.00875 M citric acid

A solution of 0.02 M FeCl₃ and 0.00875 M citric acid had an initial pH of 1.75. When the pH was increased to 2.00 at 25° C. by the addition of 0.5 M NaOH, precipitation was noted. At pH=3 to 4, additional precipitate formed.

0.02 M FeCl₃, 0.02 M citric acid

Even though this system contains too much citric acid to be used in the field in the presence of calcium ions, laboratory tests were conducted for comparison with the other systems. Initial pH of the system was 1.60. When the pH was increased to 2.00 by the addition of 0.5 M NaOH, a precipitate formed. At higher pH's to 6.35, no additional precipitates were noted. Thus, citric acid is not as effective for complexing iron in the lower pH region as it is in the high pH region.

0.02 M FeCl₃, 0.02 M citric acid, 4.4 M HCl

This system was studied to see how an actual field acidizing system would behave. The concentrated HCl was reacted with 50 wt. % NaOH and then the pH was increased stepwise by the addition of 0.5 M NaOH. A small amount of precipitate was noted at pH=2.00.

Lactic Acid: 0.02 M FeCl₃, 0.06 M lactic acid, 4.4 M NaCl

The initial pH of this system was 0.95. Voluminous precipitates occurred from pH=3.00 to pH=6.45 at 25° C.

Acetic Acid: 0.02 M FeCl₃, 15% acetic acid

The initial solution had a pH=1.60. The pH was increased to 4.00 by the dropwise addition of 50% NaOH. The solution was filtered and no precipitation was found.

One portion of the filtrate was poured into a culture tube, sealed, and placed in an oven at 88° C. Precipitation occurred after about one hour.

Another portion was returned to the pH meter at 25° C. No precipitation occurred to pH=5.00; but cloudiness was noted between pH=5.00 and 6.00.

Gluconic Acid: 0.02 M FeCl₃, 0.08 M gluconic acid, 4.4 M NaCl

The pH of the solution as prepared was measured at 1.10. The pH was then increased by the dropwise addition of 0.5 M NaOH. No evidence of precipitates was noted to pH=5.30. About 15 ml of this solution was placed in the oven at 88° C. for 16 hours. After this exposure, the color had changed from orange to brown, but no extensive precipitation was observed. The system filtered rapidly and a very small amount of brown-green precipitate was obtained on the filter.

Ethylene Diamine Tetraacetic Acid: 0.02 M FeCl₃, saturaged EDTA

An 0.02 M solution of ferric chloride was agitated with an excess of EDTA overnight. This system was filtered and 20 ml of the filtrate were placed in a small beaker. The pH was gradually increased with 0.5 M NaOH. Precipitation occurred at pH=4. Thus, EDTA is not sufficiently soluble to serve as an effective chelating agent for ferric iron salts.

Nitrilotriacetic Acid: 0.02 M FeCl₃, 0.04 M NTA

The correct amount of the components were weighed out and diluted to the appropriate volume. After two hours, all of the NTA still had not dissolved (but most of it had). The system was filtered. The pH of the filtrate was 1.60. The pH of this solution was increased by the dropwise addition of 0.5 M NaOH. At pH=3.00, the solution was cloudy and contained an obvious precipitate. The material does not seem to be sufficiently soluble to be useful to complex ferric ions in acidizing solutions.

Glycolic Acid: 0.02 M FeCl₃, 0.08 M Na glycolate, 4.4 M NaCl

The ferric chloride and the sodium chloride were dissolved in about 75 ml of H₂O. When the Na glycolate was added the solution darkened perceptibly to a brownish color. The solution was filtered. About 20 ml of the filtrate were placed in a beaker and the pH found to be 3.50. The pH was increased with 0.5 M NaOH. At pH=4.00, a subtle precipitate was present. At pH=5.00, the precipitate was obvious.

Mixtures of 5-Sulfosalicylic Acid and Citric Acid: 0.02 M $FeCl_3$, 0.04 M 5-sulfosalicylic acid, 0.00875 M citric acid, 4.4 M NaCl Apparently a small amount of the 5-sulfosalicylic acid salted out during preparation of this solution. The system was filtered. About 15 ml of the filtrate were placed in a small beaker. The pH was found to be 0.8. The pH was increased gradually by the dropwise addition of 0.5 M NaOH. No precipitates were noted in the pH range from 0.8 to 5.1. The solution was then poured into a culture tube, sealed and heated for 16 hours at 88° C. No evidence of hydrolysis was noted. The system filtered rapidly with no evidence of fine precipitates.

This is about the best system tested and demonstrates the synergistic behavior of 5-sulfosalicylic acid and citric acid.

What is claimed is:

1. In a well treating process in which an aqueous acid is injected into a subterranean reservoir, the acid as injected has a pH of less than about 2 and contains or dissolves ferric ion-containing materials and, as the acid reacts within the reservoir and reaches a pH of more than about 3, it precipitates ferric ion-containing materials, an improvement, for avoiding such a pH-induced precipitation of solids, which comprises:

dissolving within the acid solution being injected an amount of 5-sulfosalicylic acid which is sufficient to sequester significant proportions of ferric ions at a pH of from about 0.5 to 3 but is less than enough to cause a significant salting-out of solid materials, and an amount of citric acid which is sufficient to sequester significant proportions of ferric ions at a pH of from about 3 to 6 but is less than enough to precipitate a significant amount of calcium citrate.

2. The process of claim 1 in which the amount of the 5-sulfosalicylic acid is from about 0.01 to 0.05 moles per liter and the amount of citric acid is from about 0.001 to 0.009 moles per liter.

3. The process of claim 1 in which the citric and sulfosalicylic acid-containing portion of the strong acid solution is mixed with a liquid solvent for an asphaltenic oil.

4. The process of claim 3 in which the oil solvent comprises an aromatic liquid hydrocarbon which is dispersed within the aqueous acid as an oil phase of an oil-in-water emulsion.

5. The process of claim 1 in which the citric and sulfosalicylic acid-containing strong acid solution is flowed into the subterranean earth formation during the course of a fracture-acidizing treatment of the well.

6. The process of claim 1 in which the flowing of the citric and sulfosalicylic acid-containing strong acid solution into the subterranean earth formation is preceded by flowing a slug of liquid solvent for an asphaltenic oil into that formation.

7. The process of claim 1 in which the strong acid solution is a mud acid and the flowing of the citric and sulfosalicylic acid-containing portion of the mud acid into the reservoir is preceded by the flowing into the reservoir of a citric and sulfosalicylic acid-containing portion of aqueous hydrochloric acid.

8. The process of claim 1 in which the citric and sulfosalicylic acids are included in the first injected portion of the strong acid solution by mixing at least one of them with that portion in the form of substantially dry solid or relatively concentrated aqueous solution of its ammonium salt.

9. The process of claim 8 in which said ammonium salt is mixed with the aqueous acid along with a liquid oil solvent and the mixture is agitated to form a relatively homogeneous oil-in-water dispersion of oil solvent within the aqueous acid.

10. The process of claim 1 in which the injecting of the citric and sulfosalicylic acid-containing portion of strong acid solution is preceded by injecting a slug of an aqueous solution of ammonium salts of citric and sulfosalicylic acids.

11. The process of claim 10 in which the injection of said ammonium salt solution is preceded by injecting a slug of liquid oil solvent.

* * * * *